(12) United States Patent
Jung et al.

(10) Patent No.: US 9,984,659 B2
(45) Date of Patent: May 29, 2018

(54) DEVICE AND METHOD FOR ADJUSTING TRANSPARENCY OF DISPLAY USED FOR PACKAGING A PRODUCT

(71) Applicant: SAMSUNG ELECTRONICS CO., LTD., Suwon-si (KR)

(72) Inventors: Ji-hyun Jung, Seongnam-si (KR); Geun-ho Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 388 days.

(21) Appl. No.: 14/015,266

(22) Filed: Aug. 30, 2013

(65) Prior Publication Data
US 2014/0063046 A1 Mar. 6, 2014

(30) Foreign Application Priority Data
Aug. 30, 2012 (KR) .......... 10-2012-0095955

(51) Int. Cl.
*G09G 5/10* (2006.01)
*G09G 5/02* (2006.01)
(Continued)

(52) U.S. Cl.
CPC ............. *G09G 5/10* (2013.01); *G06F 1/1652* (2013.01); *G06F 3/0481* (2013.01);
(Continued)

(58) Field of Classification Search
None
See application file for complete search history.

(56) References Cited

U.S. PATENT DOCUMENTS

| | | | |
|---|---|---|---|
| 2002/0109593 A1* | 8/2002 | Swartzel | G06Q 30/06 340/540 |
| 2003/0142057 A1 | 7/2003 | Niiyama et al. | |

(Continued)

FOREIGN PATENT DOCUMENTS

| | | |
|---|---|---|
| EP | 1630770 A1 | 3/2006 |
| KR | 1020080071760 A | 8/2008 |

(Continued)

OTHER PUBLICATIONS

Christopher Brown, "ACS launches NFC reader with interactive LCD display", Mar. 30, 2011, NFCWord.com, http://www.nfcworld.com/2011/03/30/36732/acs-launches-nfc-reader-with-interactive-lcd-display/.*

(Continued)

*Primary Examiner* — Sarah Le
(74) *Attorney, Agent, or Firm* — Sughrue Mion, PLLC

(57) ABSTRACT

A device and method for adjusting the transparency of a display used for packaging a product are provided. The method includes: receiving a user input on the transparent display that encloses the product; adjusting the transparency of the transparent display based on the user input; and displaying information related to the product, which is enclosed by the transparent display, on the transparent display whose transparency has been adjusted. A transparent display with adjustable transparency includes a display configured to display product information provided by a product; a sensor configured to detect a user input on the transparent display; and a controller configured to adjust, based on the detected user input, the transparency of at least a portion of the transparent display determined by a device connected to the transparent display, and wherein the controller is configured to adjust the transparency of the deter- (Continued)

mined portion according to control information received from the device.

40 Claims, 12 Drawing Sheets

(51) Int. Cl.
*G06F 1/16* (2006.01)
*G06F 3/0481* (2013.01)
*G06F 3/0488* (2013.01)
*B65D 5/42* (2006.01)
*G09F 3/02* (2006.01)

(52) U.S. Cl.
CPC ...... *G06F 3/04883* (2013.01); *G06F 3/04886* (2013.01); *G09G 5/02* (2013.01); *B65D 5/425* (2013.01); *B65D 5/4212* (2013.01); *B65D 5/4216* (2013.01); *B65D 5/4233* (2013.01); *B65D 2203/00* (2013.01); *B65D 2203/12* (2013.01); *G09F 2003/0273* (2013.01)

(56) References Cited

U.S. PATENT DOCUMENTS

| | | | |
|---|---|---|---|
| 2006/0047585 A1 | 3/2006 | Lapa et al. | |
| 2008/0084395 A1 | 4/2008 | Dawson et al. | |
| 2008/0191846 A1* | 8/2008 | Chang | G01S 3/046 |
| | | | 340/10.41 |
| 2008/0204427 A1* | 8/2008 | Heesemans | G06F 3/0414 |
| | | | 345/174 |
| 2008/0224831 A1* | 9/2008 | Arai | G06K 7/10178 |
| | | | 340/10.51 |
| 2008/0238610 A1* | 10/2008 | Rosenberg | G06Q 20/20 |
| | | | 340/5.7 |
| 2009/0295731 A1 | 12/2009 | Kim et al. | |
| 2010/0045705 A1 | 2/2010 | Vertegaal et al. | |
| 2010/0194705 A1* | 8/2010 | Kim | G06F 1/1626 |
| | | | 345/173 |
| 2010/0283750 A1* | 11/2010 | Kang | G06F 3/0416 |
| | | | 345/173 |
| 2011/0163986 A1 | 7/2011 | Lee et al. | |
| 2011/0187655 A1 | 8/2011 | Min et al. | |
| 2011/0244924 A1* | 10/2011 | Jung | G06F 3/0481 |
| | | | 455/566 |
| 2011/0261002 A1 | 10/2011 | Verthein | |
| 2012/0060089 A1 | 3/2012 | Heo et al. | |
| 2012/0106139 A1 | 5/2012 | Ewald et al. | |
| 2012/0256886 A1* | 10/2012 | Ryu | G06F 1/1632 |
| | | | 345/204 |

FOREIGN PATENT DOCUMENTS

| | | |
|---|---|---|
| KR | 1020100012945 A | 2/2010 |
| KR | 10-2011-0081040 A | 7/2011 |
| KR | 10-2012-0023458 A | 3/2012 |
| KR | 10-2012-0032659 A | 4/2012 |

OTHER PUBLICATIONS

Communication dated May 21, 2014, issued by the European Patent Office in counterpart European Application No. 13182399.9.
International Search Report dated Dec. 10, 2013 issued in International Application No. PCT/KR2013/007807 (PCT/ISA/210/220).
Written Opinion dated Dec. 10, 2013 issued in International Application No. PCT/KR2013/007807 (PCT/ISA/237).
C.S. Hwang et al., "Technical Trends and Prospects in Transparent Display"; Electronics and Telecommunications Trends; Oct. 2010; vol. 25; No. 5; pp. 20-32.

* cited by examiner (a)　　　　　　　　(b)　　　　　　　　(c)

(a)

(b)

DEVICE AND METHOD FOR ADJUSTING TRANSPARENCY OF DISPLAY USED FOR PACKAGING A PRODUCT

RELATED APPLICATIONS

This application claims the benefit of Korean Patent Application No. 10-2012-0095955, filed on Aug. 30, 2012, in the Korean Intellectual Property Office, the disclosure of which is incorporated herein by reference, in its entirety.

BACKGROUND

1. Field

One or more exemplary embodiments relate to a device and method for adjusting, based on a user input, the transparency of a display used for packaging a product.

2. Description of the Related Art

In general, materials such as vinyl, plastic, and paper are used to package products. However, since the transparency of such packaging materials cannot be adjusted, in response to a packaging material being opaque, a user cannot see, with the naked eye, a product enclosed therein. On the other hand, even though a packaging material may be transparent, it may be difficult for the user to view product information displayed on the product, such as a product name and a brand name. Thus, there is a need for a technique for effectively displaying various types of product information on a packaging material for a product and allowing a user to see the packaged product with the naked eye.

SUMMARY

One or more exemplary embodiments include a method and device for adjusting the transparency of a display used for packaging a product, whereby the adjusting of the transparency of a portion of the display is determined based on a user input on the display.

Additional aspects will be set forth in part in the description which follows and, in part, will be apparent from the description, or may be learned by practice of the exemplary embodiments.

According to one or more exemplary embodiments, a method of adjusting transparency of a transparent display used for packaging a product may include: receiving a user input on the transparent display that encloses the product; adjusting the transparency of the transparent display based on the received user input; and displaying on the transparent display whose transparency has been adjusted information related to the product, which is enclosed by the transparent display.

The user input may include a touch input. In adjusting the transparency of the transparent display, a portion of the transparent display whose transparency will be adjusted may be determined based on the touch input and the transparency of the determined portion may be adjusted.

In adjusting the transparency of the transparent display, the transparency of a portion of the transparent display within a preset range from the touch input point may be adjusted.

The touch input may include an input that occurs in response to a closed curve being drawn on a surface of the transparent display. In adjusting the transparency of the transparent display, the transparency of a portion of the transparent display within the closed curve may be adjusted.

The user input may include a touch input. In adjusting the transparency of the transparent display, a degree of transparency of the transparent display may be determined based on the touch input, and the transparency of the transparent display may be adjusted according to the determined degree of transparency.

In adjusting the transparency of the transparent display, the transparency of the transparent display may be adjusted in a step-wise manner based on the number of touches on the transparent display by a user.

The user input may include an input through a user's hand holding the transparent display. In adjusting the transparency of the transparent display, a portion of the transparent display whose transparency will be adjusted may be determined based on a position of the transparent display held in the user's hand, and the transparency of the determined portion may be adjusted.

In adjusting the transparency of the transparent display, the transparency of a portion of the transparent display opposite from the portion of the transparent display held by the user's hand may be adjusted.

The user input may include an input through a user's hand holding the transparent display. In adjusting the transparency of the transparent display, a degree of transparency of the transparent display may be determined based on a magnitude of a pressure exerted on the transparent display by the user's hand holding the transparent, and the transparency of the transparent display may be adjusted according to the determined degree of transparency.

The method may further include receiving, via short-range communication, the product information from a tag attached to the product.

The product information may be received from the product by a Near Field Communication (NFC) reader included in the transparent display.

The product information may include at least one of an identifier value of the product, a current inventory status, a warehouse plan, a price, discount coupons and advertising information.

In displaying the product information on the transparent display, in response to the transparency of the transparent display being adjusted, the displayed product information may be changed.

According to one or more exemplary embodiments, a device for adjusting transparency of a transparent display used for packaging a product may include: a user input receiver configured to receive user input on the transparent display that encloses the product; a transparency adjuster configured to adjust the transparency of the transparent display based on the user input; and a product information display configured to display on the transparent display whose transparency has been adjusted information related to the product, which is enclosed by the transparent display.

The user input may include a touch input. The transparency adjuster may determine a portion of the transparent display whose transparency will be adjusted based on the touch input, and may adjust the transparency of the determined portion.

The transparency adjuster may also adjust the transparency of a portion of the transparent display within a preset range from the touch input point.

The touch input may include an input that occurs in response to a closed curve being drawn on a surface of the transparent display. The transparency adjuster may be configured to adjust the transparency of a portion of the transparent display within the closed curve.

The user input may include a touch input. The transparency adjuster may be configured to determine a degree of transparency of the transparent display based on the touch input, and may adjust the transparency of the transparent display according to the determined degree of transparency.

The transparency adjuster may adjust the transparency of the transparent display in a step-wise manner based on the number of touches on the transparent display by the user.

The user input may include an input performed while the user input is being hand held. The transparency adjuster may be configured to determine a portion of the transparent display whose transparency will be adjusted based on a position of a portion of the transparent display held in the user's hand, and may adjust the transparency of the determined portion.

The transparency adjuster may adjust the transparency of a portion of the transparent display which is opposite from the portion of the transparent display held in the user's hand.

The user input may include an input through a user's hand holding the transparent display. The transparency adjuster may be configured to determine a degree of transparency of the transparent display based on a magnitude of a pressure exerted on the transparent display through the user's hand holding the transparent display, and may adjust the transparency of the transparent display according to the determined degree of transparency.

The device may further include a product information receiver configured to receive, via short-range communication, the product information from a tag attached to the product.

The product information may be received from the product by an NFC reader included in the transparent display.

The product information may include at least one of an identifier value of the product, a current inventory status, a warehouse plan, a price, discount coupons and advertising information.

The product information display may be configured to change the information related to the displayed product and may display the resultant product information after the transparency of the transparent display has been adjusted.

According to one or more exemplary embodiments, a method of adjusting the transparency of a transparent display used for packaging a product may include sensing a user input on the transparent display and adjusting, based on the sensed user input, the transparency of a portion of the transparent display determined by a device connected to the transparent display. In adjusting the transparency, the transparency of the determined portion may be adjusted according to control information received from the device.

According to one or more exemplary embodiments, a transparent display with adjustable transparency includes: a display configured to display product information provided by a product; a sensor configured to detect a user input on the transparent display; and a controller configured to adjust, based on the detected user input, the transparency of a portion of the transparent display determined by a device connected to the transparent display. The controller may be configured to adjust the transparency of the determined portion according to control information received from the device.

An aspect of an exemplary embodiment may provide a device for adjusting the transparency of a transparent display used for packaging and enclosing a product the device including: a transparency adjuster configured to adjust the transparency of the transparent display; and a product information display configured to display information related to the product on the transparent display whose transparency has been adjusted, which is enclosed by the transparent display.

The device for adjusting the transparency of a transparent display used for packaging and enclosing a product may further include: a user input receiver configured to receive a user input on the transparent display that encloses the product.

The transparency adjuster may adjust the transparency of the transparent display based on a user input. The user input may include a touch input, and wherein the transparency adjuster is configured to determine a portion of the transparent display whose transparency will be adjusted based on the touch input, and adjusts the transparency of the determined portion.

The transparency adjuster may adjust the transparency of a portion of the transparent display within a preset range from the touch input point.

The touch input may include an input that occurs in response to a closed curve being drawn on a surface of the transparent display, wherein the transparency adjuster is configured to adjust the transparency of a portion of the transparent display within the closed curve.

The user input may include a touch input, wherein the transparency adjuster is configured to determine a degree of transparency of the transparent display based on the touch input, and adjusts the transparency of the transparent display according to the determined degree of transparency.

In addition, the transparency adjuster may adjust the transparency of the transparent display in a step-wise manner based on a number of touches on the transparent display. The user input may include an input by a user's hand holding the device, wherein the transparency adjuster is configured to determine a degree of transparency of the transparent display based on a magnitude of a pressure exerted on the transparent display by the user's hand holding the device, and adjust the transparency of the transparent display according to the determined degree of transparency.

The device for adjusting the transparency of a transparent display used for packaging and enclosing a product may further include a product information receiver configured to receive the product information from a tag attached to the product via short-range communication. The product information may be received from the product by a Near Field Communication (NFC) reader included in the transparent display.

According to one or more exemplary embodiments, a non-transitory computer-readable recording medium has recorded thereon a program which executes on a computer one of the methods according to the one or more exemplary embodiments.

According to one or more exemplary embodiments, a non-transitory computer-readable recording medium has recorded thereon a program which executes on a computer other methods according to the one or more exemplary embodiments.

BRIEF DESCRIPTION OF THE DRAWINGS

These and/or other aspects will become apparent and more readily appreciated from the following description of the exemplary embodiments, taken in conjunction with the accompanying drawings of which.

DETAILED DESCRIPTION

Figure 1:
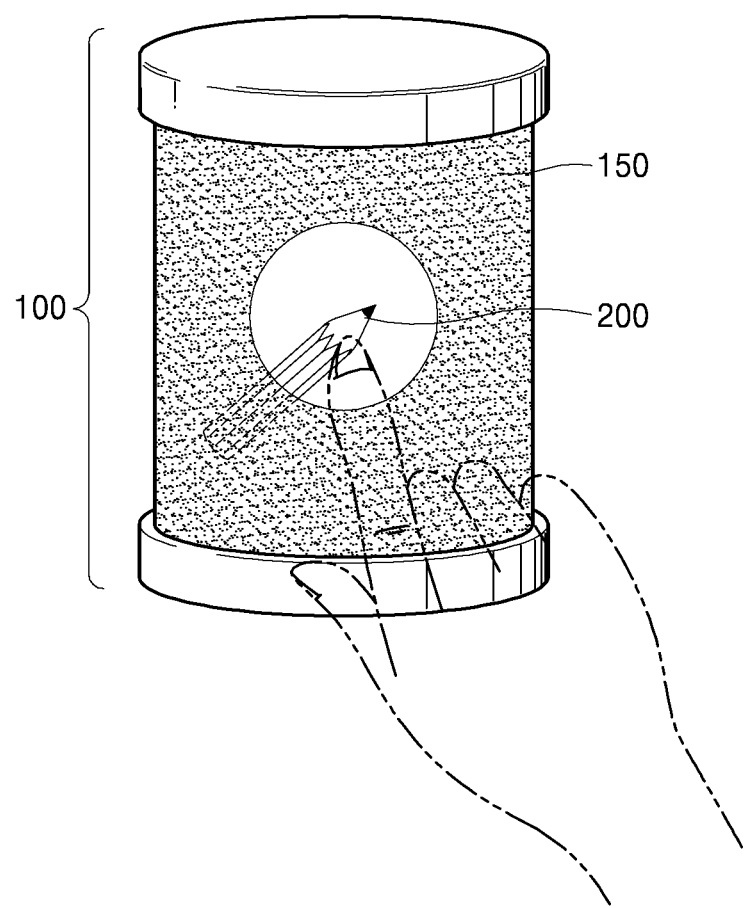
FIG. 1 illustrates an example of displaying product information on a display used for packaging a product and adjusting the transparency of the display in a device according to an exemplary embodiment.

Reference will now be made in more detail to the exemplary embodiments, examples of which are illustrated in the accompanying drawings, wherein like reference numerals refer to like elements throughout. The exemplary embodiments are detailed enough for a person of ordinary skill in the art to easily carry out the invention. However, the exemplary embodiments may be implemented in different forms and are not limited to the exemplary embodiments described herein. Furthermore, parts not related to a detailed description will be omitted for purposes of clarity. Throughout the specification, it will be understood that when an element is referred to as being "connected" or "coupled" to another element, it can be directly connected or coupled to the other element, or intervening elements may be present. It will also be understood that when the terms "includes," "comprises," "including," and/or "comprising" specify the presence of stated elements and/or components, but do not preclude the presence or addition of one or more elements and/or components thereof unless expressly specified to the contrary. Expressions such as "at least one of," when preceding a list of elements, modify the entire list of elements and do not modify the individual elements of the list.

A "display" in the specification may be a flexible display. For example, such a flexible display may be foldable, bendable, or rollable. The transparency of the display may be adjusted.

"Product information" refers to details of a product including at least one of a product name, a brand name, a product description, a current inventory status, a warehousing plan, a price, discount coupons, and advertising information.

Exemplary embodiments will now be described in detail with reference to the accompanying drawings.

FIG. 1 illustrates an example of displaying product information on a display 150 used for packaging a product 200 and adjusting the transparency of the display 150 in a device 100 according to an exemplary embodiment.

Referring to FIG. 1, the device 100 includes the display 150, predetermined product information which is displayed on the display 150 that wraps the product 200, and the transparency of the display 150 may be adjusted. Adjusting the transparency of the display 150 means controlling the transparency of a display 154 (FIG. 19) included in the display 150.

The device 100 receives product information from the product 200 and displays the product information on display 150. The device 100 may receive the product information from the product 200 via near field communication (NFC). The product 200 and the display 150 may each include NFC tags. For example, an NFC chip and an NFC reader may be respectively attached to the product 200 and the display 150. The device 100 may receive the product information from the NFC chip through the NFC reader. However, the exemplary embodiments are not limited thereto, and the device 100 may receive the product information from the product 200 by using Bluetooth communication.

The device 100 may also adjust the transparency of a predetermined portion of the display 150 based on a user input on the display 150 and may change the product information displayed on the display 150.

Furthermore, the device 100 and the display 150 may each include batteries that can be charged through the use of a wireless charging method. For example, shelves in a store may perform a wireless charging function in order to charge the batteries in the device 100 and the display 150 by supplying power to the batteries in a wireless manner. However, the exemplary embodiments are not limited thereto, and the batteries in the device 100 and the display 150 may be charged in a wired manner.

Figure 2:
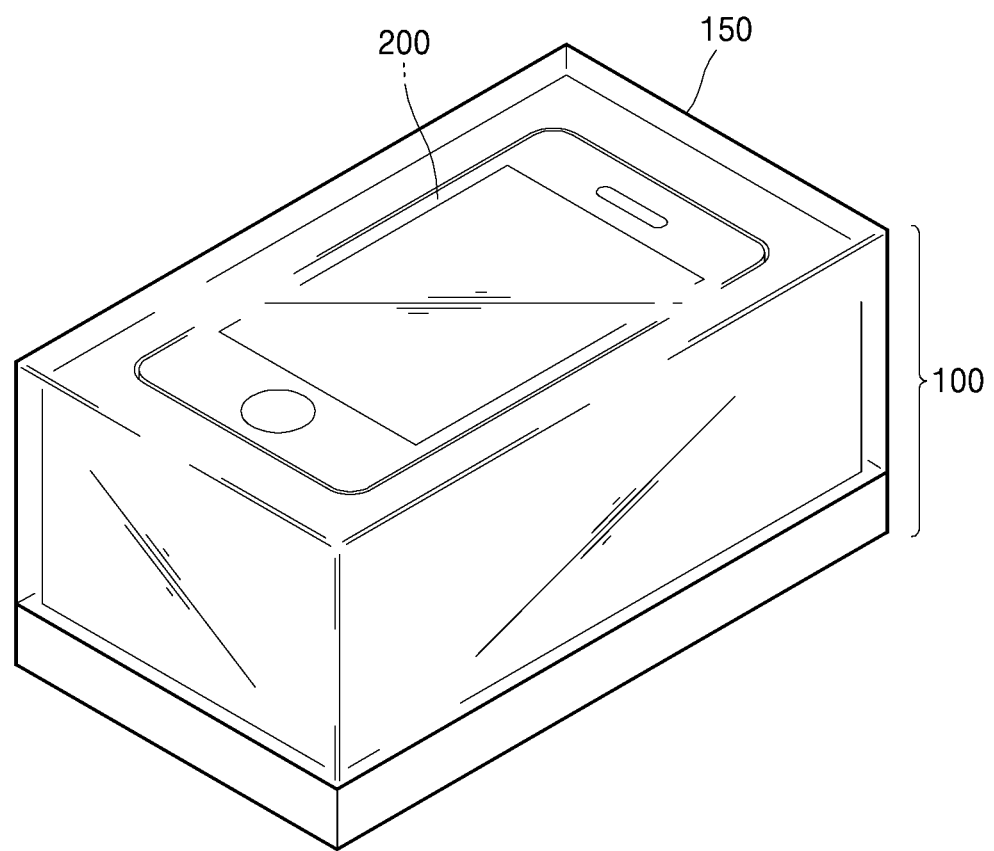
FIG. 2 illustrates examples of a product and a device according to an exemplary embodiment.

FIG. 2 illustrates examples of a product 200 and a device 100 according to an exemplary embodiment.

As shown in FIG. 2, the product 200 may be a mobile phone, and the device 100 including a display 150 may be used to package the mobile phone. The display 150 may be configured to store information related to the product 200 ("product information") and may display the product information on a display unit 154 therein. For example, the product information may include a user guide for the mobile phone, and the user guide may be previously stored in the display 150, which is used for packaging the mobile phone, during manufacture of the display 150. However, the exemplary embodiments are not limited thereto, and the display 150 may receive the user guide from a tag contained in the mobile phone. Alternatively, the display 150 may receive information related to a link for receiving a user guide from a tag contained in the mobile phone and may use the link information to receive the user guide from a separate server (not shown).

The product information may also include information on a message related to the product 200 input by a user and information on a link for downloading the message. The user may enter a message related to the product 200 into the display 150 used for packaging the product 200 when purchasing the product 200. However, the exemplary embodiments are not limited thereto, and the user may enter the message related to the product 200 into a tag contained in the product 200. For example, the message entered by the user may be a text and may contain a congratulatory message that will be sent to a recipient of the product 200. Alternatively, the product information may be audio data, and in this case, may be output through a speaker (not shown) included in or connected to the device 100.

In response to the product information being audio data, the product information may also be output through a speaker built into the product 200. For example, the product information may be output via a smart phone speaker. In this case, the product 200 may receive via NFC information related to a link for downloading the audio data stored in the display 150 or the device 100. For example, the link information may include information related to a location in a memory where the audio data is stored and information related to a server address for downloading the audio data, but is not limited thereto.

For example, the product 200 may also receive audio data based on information related to a link received via wireless fidelity (WIFI) communication. In this case, the device 100 may transmit wireless communication information to the product 200. The wireless communication information may include the type of wireless communications available to the device 100 and connectivity information.

The product 200 may also determine a predetermined method of communication based on the received wireless communication information and may transmit to the device 100 information related to the method of communication. The product 200 may determine a wireless communication method that can be used by the product 200 from among the wireless communication methods available to the device 100. Information related to the determined communication method may include an identifier value of the communication method and connectivity information needed for a connection using the wireless communication method.

Based on information related to the determined communication method, the device 100 may establish communication with the product 200 according to a wireless communication method determined by product 200.

Figure 3:
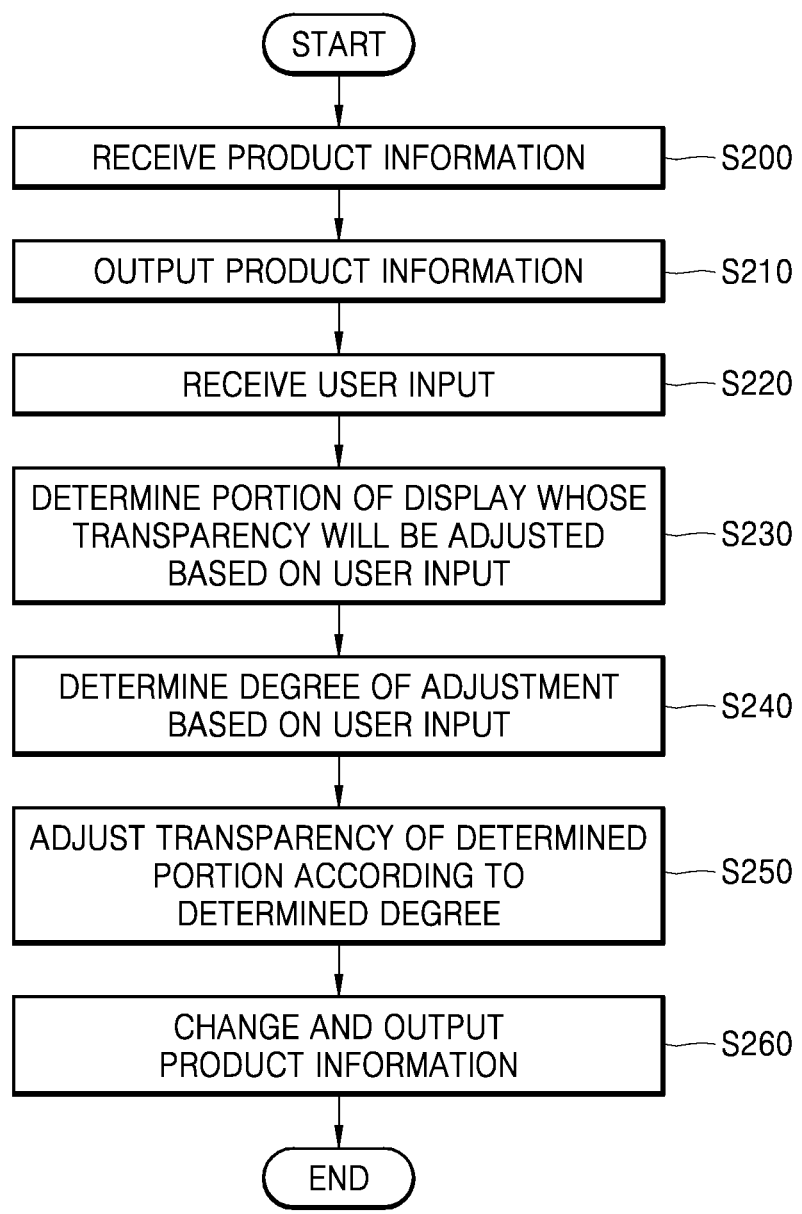
FIG. 3 is a flowchart of a method of displaying product information on the device according to an exemplary embodiment.

FIG. 3 is a flowchart of a method of displaying product information related to the device 100 according to an exemplary embodiment.

Referring to FIG. 3, the device 100 receives product information from the product 200 (S200). The product 200 and the display 150 each include NFC tags, so that the device 100 may receive the product information from the product 200 via NFC. When the device 100 and the display 150 are separate devices, at least one of the device 100 and the display 150 may include an NFC tag.

The device 100 may also receive an identifier value of the product 200 from the product 200 via NFC and may receive various pieces of product information related to the product 200 from a separate server (not shown), based on the identifier value of the product 200. Alternatively, the device 100 may recognize a marker, such as a barcode or quick response (QR) code, indicated on the product 200, and may receive product information from a server (not shown) by using the recognized value. The product information may include at least one of a product name, a brand name, a product description, a current inventory status, a warehousing plan, a price, discount coupons and advertising information. The product description may include an origin of the product 200, an expiry date, a nutritional content and an intended age range.

The product information may also be updated through an NFC tag attached to the product 200. However, the exemplary embodiments are not limited thereto. The device 100 may update the product information through a server (not shown).

The device 100 outputs the product information to the display 150 (S210). The device 100 may display on the display 150 some pieces of the received production information. The device 100 may also determine pieces of the product information to be displayed on the display 150 according to the transparency of the display 150. For example, in response to the display 150 being transparent, the device 100 may display a product name, a brand name, and a price on the display 150. On the other hand, in response to the display 150 being opaque, the device 100 may display on the display 150 a product description, a current inventory status, a warehousing plan and discount coupons. However, the exemplary embodiments are not limited thereto.

The device 100 receives a user input through the display 150 (S220). The user input may include a touch input on a portion of the display 150, an input that occurs when a user holds the display 150 in their hand, and an input that occurs when the user lifts or lowers the display 150 while holding it in their hand, but is not limited thereto. The device 100 may also receive the user input through the display 150 by using at least one of a touch sensor, a pressure sensor, an accelerometer and a gyro sensor.

The device 100 determines a portion of the display 150 whose transparency is to be adjusted (hereinafter referred to as a "target portion") based on the user input (S230). The device 100 may determine the target portion based on a user's touch input. For example, in response to the user touching the display 150, the device 100 may adjust the transparency of a portion of the display 150 within a preset range from a touch point. In another example, in response to the user rubbing a portion of display 150, the device 100 may adjust the transparency of the rubbed portion of the display 150. Alternatively, in response to the user drawing a closed curve on a surface of the display 150, the device 100 may adjust the transparency of a region of the display 150 within the closed curve. However, the exemplary embodiments are not limited thereto, and the target portion may be determined according to other various criteria, e.g., based on a position of a portion of the display 150 touched by the user and based on the number of user touches.

In another exemplary embodiment, the device 100 may determine the target portion based on an input by a user holding the device in their hand. For example, in response to the user holding the display 150 in their hand, the device 100 may adjust the transparency of a portion of the display 150 opposite to the hand-held portion. In this case, the device 100 may also determine an area of the target portion according to a magnitude of a pressure exerted on the display 150 by the user's hand holding the device.

In another exemplary embodiment, the device 100 may determine the target portion based on a movement of the device 100. For example, in response to the user lifting the device 100, the device 100 may adjust the transparency of a lower portion of the display 150. Conversely, in response to the user putting down the device 100, the device 100 may make a determination to adjust the transparency of an upper portion of the display 150. In response to the user shaking the device 100, the device 100 may cancel adjustment of the transparency of the display 150. In this case, the device 100 may detect its movement by using at least one of a motion sensor and a gyro sensor, but the exemplary embodiments are not limited thereto.

In another exemplary embodiment, the device 100 may determine a target portion based on an eye gaze direction of a user looking at the display 150. For example, in response to the user looking at a lower area of the display 150, the device 100 may adjust the transparency of a lower portion of the display 150. In response to the user looking at an upper area of the display 150, the device 100 may adjust the transparency of an upper portion of the display 150. In this case, the device 100 may take a picture of the user with a camera to check the user's eye gaze direction based on the photographed image, but the exemplary embodiments are not limited thereto.

Although the device 100 may adjust the transparency of a portion of the display 150, the exemplary embodiments are not limited thereto. In other words, the device 100 may adjust the transparency of the entire display 150.

The device 100 determines a degree to which the transparency of the display 150 is adjusted based on the user input (S240). The device 100 may determine the degree of transparency of the display 150 based on a user's touch input. In this case, the device 100 may adjust the transparency of the display 150 in a step-wise manner based on the number of touches by the user. Alternatively, the device 100 may determine the degree of adjustment based on a pressure applied to the display 150 by a user's touch thereon.

In another exemplary embodiment, the device 100 may determine the degree of adjusting the transparency of the display 150 based on an input by a user holding the device in their hand. In this case, the device 100 may determine a degree of adjusting the transparency of the display 150 based on a pressure exerted on the display 150 according to a magnitude of a pressure exerted on the display 150 by the user holding the device in their hand.

In another exemplary embodiment, the device 100 may output a separate user interface (UI) to the display 150 which determines the target portion and the degree of adjusting the transparency thereof, and may determine the target portion and the degree of adjusting the transparency thereof based on a user input through the UI.

The device 100 adjusts the transparency of the determined target portion according to the determined degree of adjustment (S250). That is, the device 100 adjusts the transparency of the target portion determined in operation S250 according to the degree of adjustment determined in operation S240.

The device 100 changes the product information and outputs the resultant information to the display 150 (S260). As the transparency of a portion of the display 150 or the entire display 150 is adjusted, the device 100 changes the product information displayed on the display 150 and outputs the resultant information to the display 150. In response to the entire display 150 being transparent, the device 100 may display a few pieces of the product information on the display 150. In contrast, in response to the entire display 150 being opaque, the device 100 may display many pieces of the product information on the display 150. However, the exemplary embodiments are not limited thereto.

In response to only a portion of the display 150 being transparent while the rest of the display 150 is opaque, the device 100 may determine product information to be displayed on the display 150 based on an area of the transparent portion of display 150. The device 100 may also separate product information to be displayed on the transparent portion of the display 150 from that to be displayed on the opaque portion thereof.

In another exemplary embodiment, the device 100 sequentially displays various pieces of product information according to a user's touch input on the display 150. For example, the device 100 may display a product name when the user touches the display 150 once. In response to a user touching the display 150 twice, the device may display a price and a current inventory status of the product 200. In response to a user touching the display 150 three times, the device may display a user's message related to the product 200. Alternatively, a product name, a price and a current inventory status for the product 200, and a user's message related to the product 200 may be respectively displayed on the display 150 upon a first touch, a second touch, and a third touch on the display 150.

Figure 4:
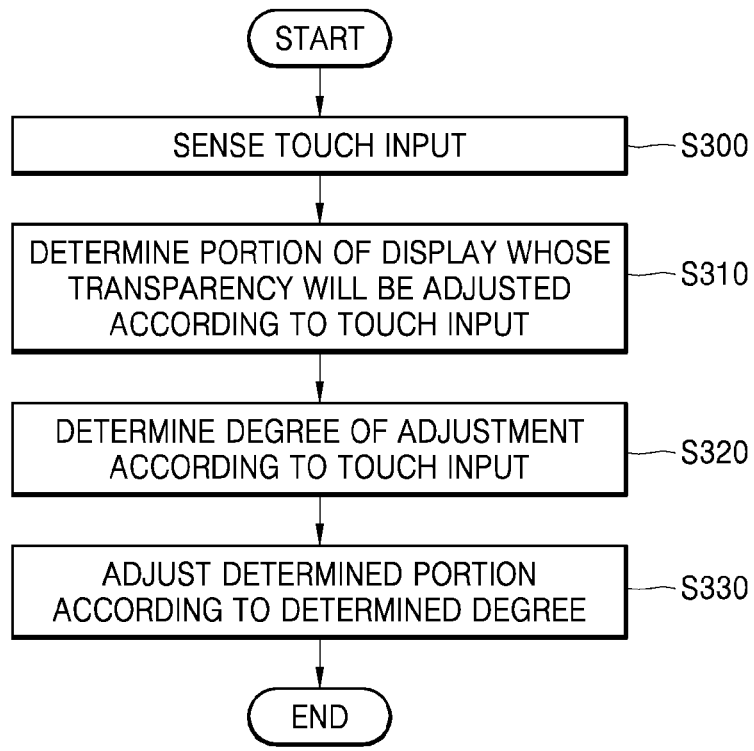
FIG. 4 is a flowchart of a method of adjusting the transparency of a display based on a touch input on the display according to an exemplary embodiment.

FIG. 4 is a flowchart of a method of adjusting the transparency of the display 150 based on a touch input on the display 150, according to an exemplary embodiment.

Referring to FIG. 4, the device 100 senses a touch input on the display 150 (S300). For example, the device 100 may detect a user's touch input by using a touch sensor or a pressure sensor.

The device 100 determines a target portion of the display 150 whose transparency is to be adjusted (S310) according to the touch input on the display 150 (S310). In this case, the device 100 may determine the target portion based on a position of a portion of the display 150 touched by a user. For example, the device 100 may determine as the target portion a region of the display 150 that is within a preset range from a touch point. In another example, in response to the user drawing a closed curve on the display 150, the device 100 may determine a region of the display 150 within the closed curve as the target portion. In addition, in response to the user touching three or more points of the display 150, the device 100 may determine a region within a figure formed by joining the three or more touch points as vertices as the target region. In yet another example, in response to the user rubbing a portion of the display 150, the device 100 may determine the rubbed portion as the target portion.

In another exemplary embodiment, the device 100 may determine the entire region of the display 150 as the target portion according to a predetermined touch input. For example, in response to a user's touch input lasting more than a preset time, the device 100 may determine the entire region of the display 150 as to be the target portion.

The device 100 determines a degree to which the transparency of the display 150 is adjusted according to the touch input (S320). In this case, the device 100 may determine the degree of adjusting the transparency of the display 150 based on the number of touch inputs. For example, in response to the user touching the display 150 a plurality of times, the device 100 may gradually change the transparency of the display 150 according to the number of touches. In this case, the device 100 may preset values of transparency which correspond to the number of touches. Furthermore, in response to the user's touch input lasting more than a preset time, the device 100 may gradually change the transparency of the display 150 according to the duration of the touch input.

In another exemplary embodiment, in response to the user rubbing the display 150 a plurality of times within a preset time, the device 100 may gradually change the transparency of the display 150 according to the number of times that the user rubs the display 150. In addition, in response to the user drawing a plurality of closed curves on the display 150 within a preset time, the device 100 may change the transparency of the display 150 in a step-wise manner according to the number of closed curves.

Alternatively, the device 100 may adjust the transparency of the display 150 according to a pressure exerted on the display 150 due to a user's touch thereon. In this case, the device 100 may preset values of transparency which correspond to magnitudes of the pressure applied to the display 150.

The device 100 adjusts the transparency of the determined target portion according to the determined degree (S330). That is, the device 100 may adjust in operation S330 the transparency of the target portion determined in operation S310, according to the degree of adjustment determined in operation S320.

Figure 5:
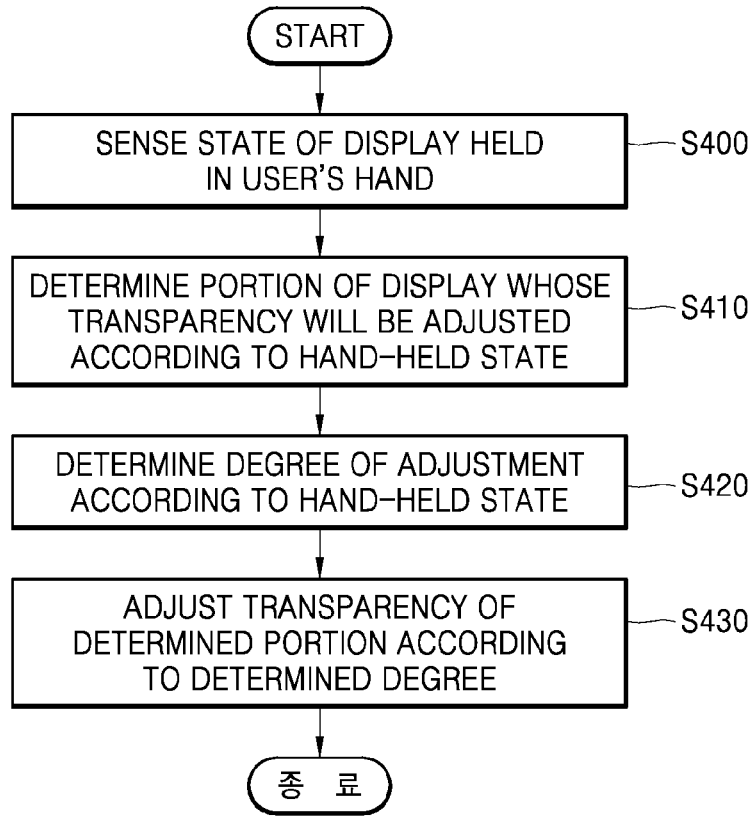
FIG. 5 is a flowchart of a method of adjusting the transparency of a display based on a state of the display held in the user's hand according to an exemplary embodiment.

FIG. 5 is a flowchart of a method of adjusting the transparency of the display 150 based on a state of the display 150 held in a user's hand, according to an exemplary embodiment.

Referring to FIG. 5, the device 100 senses a state of the display 150 held in the user's hand (S400). In response to the user gripping the display 150, the device may sense a state in which the user holds the display 150 in hand by using a touch sensor or pressure sensor. The hand-held state may include a position of a portion of the display 150 held in the user's hand and a pressure applied to the display 150, but the exemplary embodiments are not limited thereto.

The device 100 determines a target portion of the display 150 whose transparency is to be adjusted according to the state of the display 150 held in the user's hand (S410). The device 100 checks a position of a portion of the display 150 held in the user's hand and adjusts the transparency of the remaining portion (not the hand-held portion) of the display 150. For example, the device 100 may determine as the target portion a portion of the display 150 opposite to the hand-held portion. The device 100 may also determine an area of the target portion according to a magnitude of a pressure exerted on the display 150 resulting from the user holding the device in their hand. In this case, the device 100 may preset values of an area of the target portion which correspond to magnitudes of a pressure applied to the display 150, due to the user holding the device in their hand.

The device 100 determines a degree of adjusting the transparency of the display 150 according to the state of the display 150 held in the user's hand (S420). To this end, the device 100 may check a magnitude of a pressure exerted on the display 150 as a result of the user's hand holding, and may determine the degree of adjusting the transparency thereof according to the magnitude of the pressure. For example, as the magnitude of the pressure applied to the display 150 increases, the display 150 may become more transparent. In this case, the device 100 may preset degrees of adjustment which correspond to magnitudes of a pressure applied to the display 150 by the user holding the device in their hand.

The device 100 adjusts transparency of the determined target portion according to the determined degree (S430). That is, the device 100 may adjust in operation S430 the transparency of the target portion determined in operation S410 according to the degree of adjustment determined in operation S420.

Figure 6:
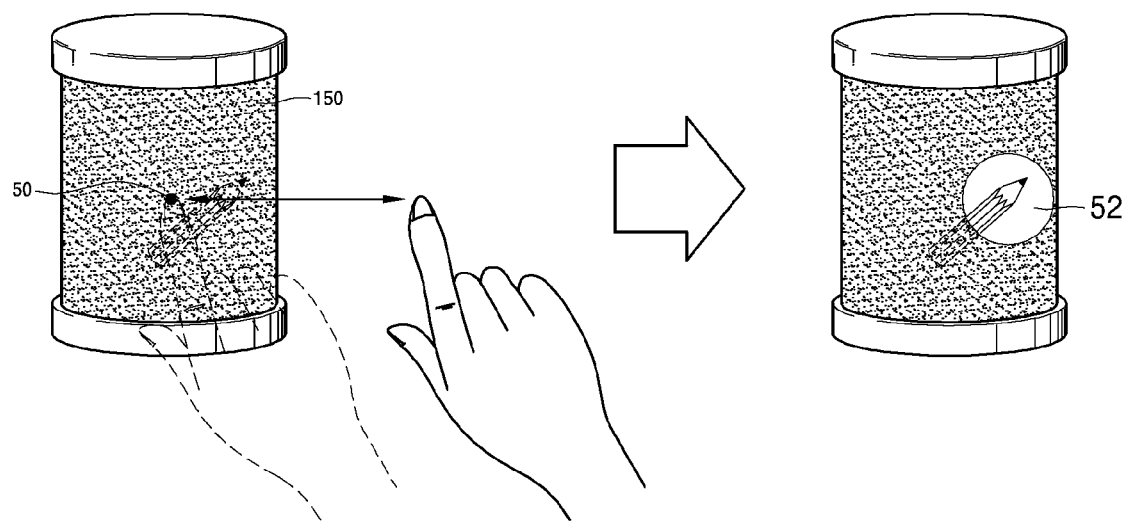
FIG. 6 illustrates an example of adjusting the transparency of a portion of a display based on a touch input according to an exemplary embodiment.

FIG. 6 illustrates an example of adjusting the transparency of a portion of a display 150 based on a touch input according to an exemplary embodiment.

Referring to FIG. 6, in response to the user touching a predetermined point 50 of the display 150, the device 100 may make transparent a portion of the display 150 which corresponds to a region 52 within a preset range from the point 50. In this case, the device 100 may adjust the transparency of the portion of the display 150 which corresponds to the region 52 based on a magnitude of a pressure applied to the display 150 due to the user's touch, but the exemplary embodiments are not limited thereto.

Figure 7:
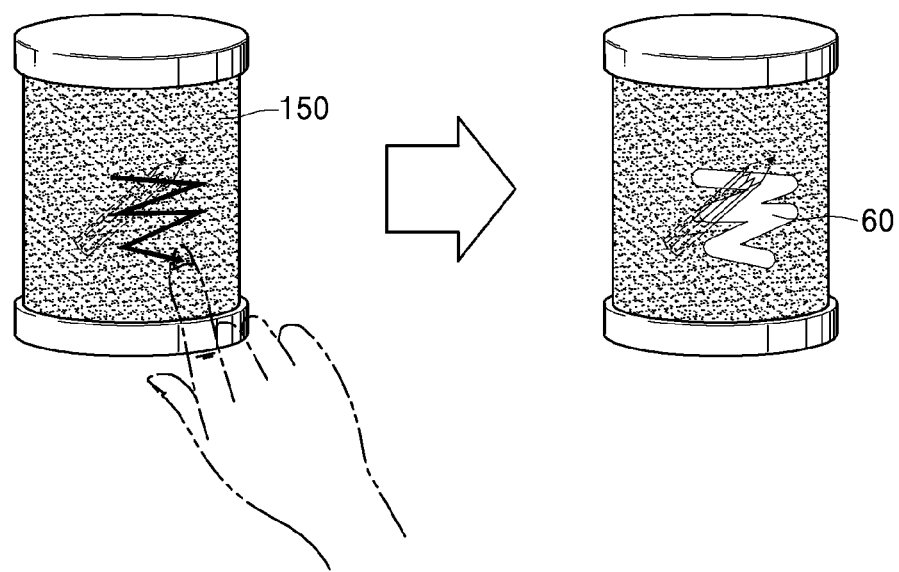
FIG. 7 illustrates an example of adjusting the transparency of a portion of a display based on a touch input according to another exemplary embodiment.

FIG. 7 illustrates an example of adjusting the transparency of a portion of the display 150 based on a touch input according to another exemplary embodiment.

Referring to FIG. 7, in response to a user rubbing the display 150, the device 100 may make transparent a portion 60 of the display 150 rubbed by the user. In this case, the device 100 may adjust the transparency of the portion 60 of the display 150 based on a magnitude of a pressure applied to the display 150 by the user's touch, but the exemplary embodiments are not limited thereto. Alternatively, the device 100 may make opaque a portion of the display 150 rubbed by the user while making transparent a portion thereof not rubbed by the user.

Figure 8:
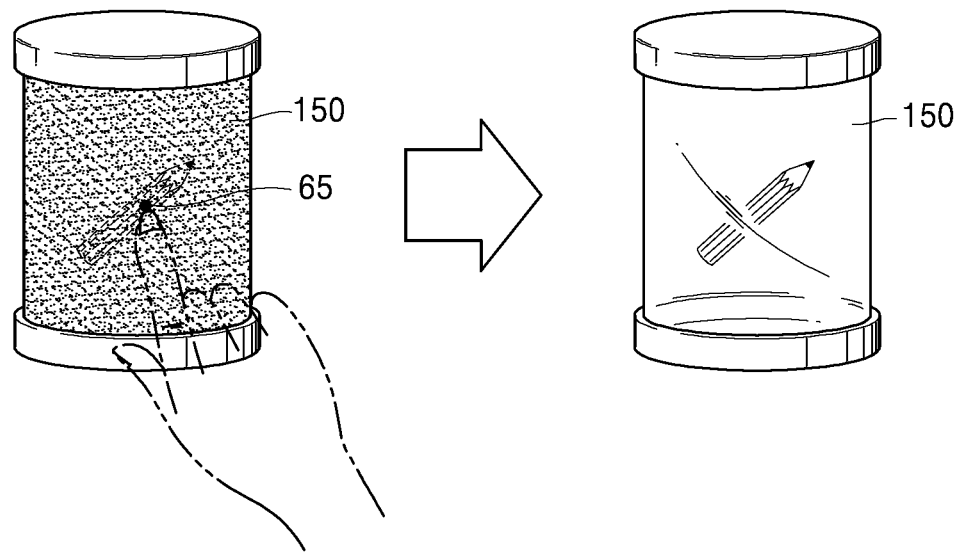
FIG. 8 illustrates an example of adjusting the transparency of the entire display based on a touch input according to an exemplary embodiment.

FIG. 8 illustrates an example of adjusting the transparency of an entire region of the display 150 based on a touch input according to an exemplary embodiment. Referring to FIG. 8, in response to a user's touch on a predetermined point 65 of the display 150 lasting for more than a preset time, the device 100 may make the entire region of the display 150 transparent. In this case, the device 100 may adjust the transparency of the display 150 based on a magnitude of pressure applied to the display 150 by the user's touch, but the exemplary embodiments are not limited thereto.

Figure 9:
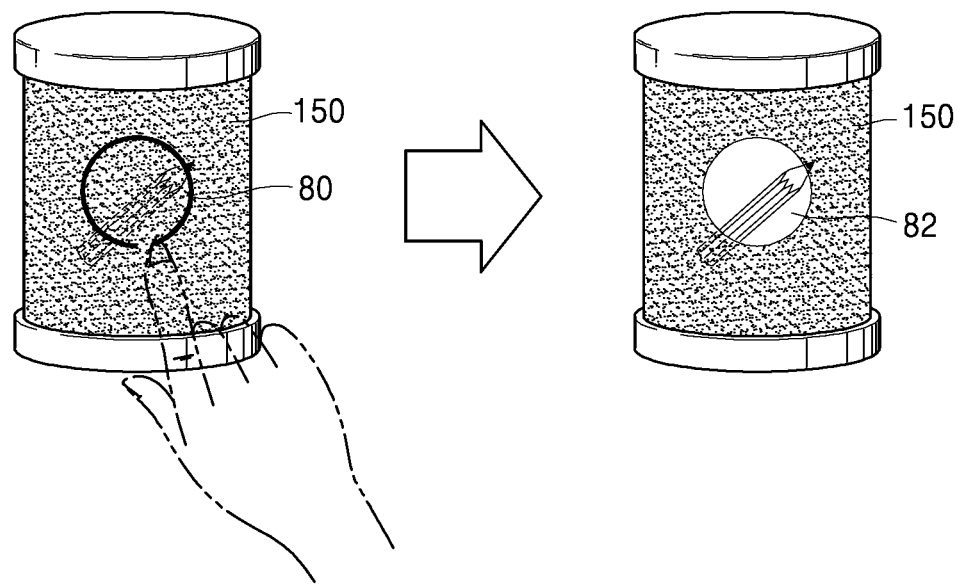
FIG. 9 illustrates an example of adjusting the transparency of a portion of a display in response to a closed curve being drawn on the display using a touch input, according to an exemplary embodiment.

FIG. 9 illustrates an example of adjusting the transparency of a portion of the display 150 in response to a closed curve being drawn on the display 150 using a touch input according to an exemplary embodiment.

Referring to FIG. 9, in response to the user drawing a closed curve 80 on the display 150, the device 100 may make transparent a portion 82 of the display 150 included in the closed curve 80. In this case, the device 100 may adjust the transparency of the portion 82 of the display 150 based on a magnitude of pressure applied to the display 150 by the user's touch, but the exemplary embodiments are not limited thereto.

Figure 10:
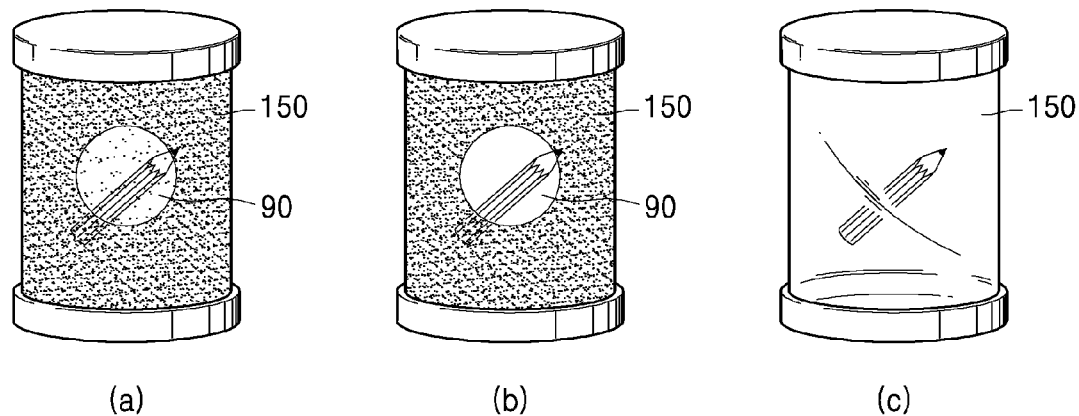
FIGS. 10A through 10C illustrate an example of adjusting the transparency of a display according to an exemplary embodiment based on the number of touches on the display.

FIGS. 10A through 10C illustrate an example of adjusting the transparency of the display 150 according to an exemplary embodiment, based on the number of touches on the display 150.

Referring to FIG. 10A, in response to the user touching the display 150 once within a preset time, the device 100 may adjust the transparency of the display 150 so that a portion thereof which corresponds to a region 90 within a preset range from a touch point becomes semitransparent.

Referring to FIG. 10B, in response to the user touching the display 150 twice within a preset time, the device 100 may adjust the transparency of the display 150 so that a portion thereof which corresponds to the region 90 within the preset range from the touch point becomes transparent.

Referring to FIG. 10C, in response to the user touching the display 150 three times within a preset time, the device 100 may adjust the transparency of the display 150 so that the entire region thereof becomes transparent.

Figure 11:
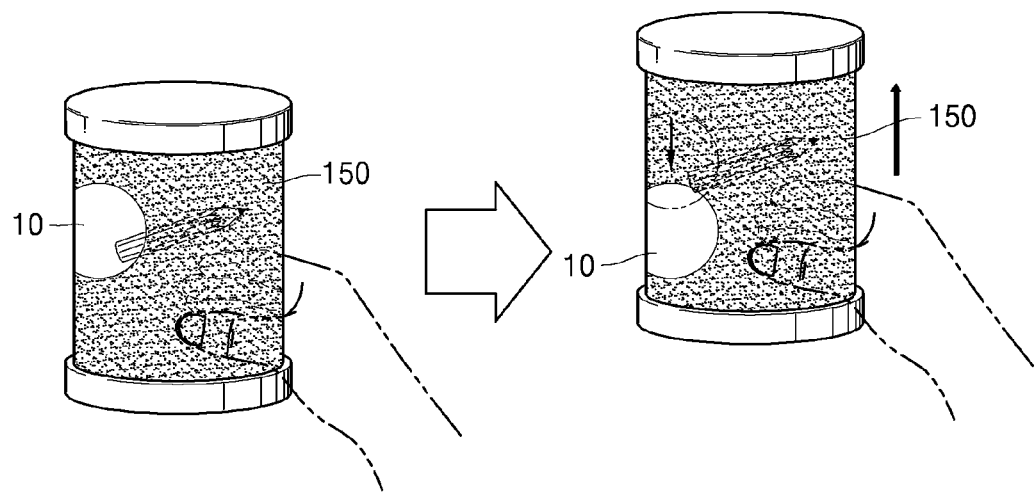
FIG. 11 illustrates an example of adjusting the transparency of a portion of a display based on an input a user's hand which is holding the transparent display according to an exemplary embodiment.

FIG. 11 illustrates an example of adjusting the transparency of a portion of the display 150 based on an input by user holding the device in their hand, according to an exemplary embodiment.

Referring to FIG. 11, in response to the user holding the display 150 in hand, the device 100 may adjust the transparency of a portion of the display 150 which corresponds to a portion 10 held in the user's hand. Furthermore, in response to the user 150 lifting up the display 150, the device 100 may move a position of the portion 10 whose transparency has been adjusted down to a lower portion of the display 150. In this case, the device 100 may check how far the display 150 has been lifted up by using a motion sensor and a gyro sensor. The device 100 may also take a picture of the user by using an imaging device (not shown) and may determine a position and a distance by which the portion 10 is moved according to the taken image, and may determine an extent of lifting the display 150.

Figure 12:
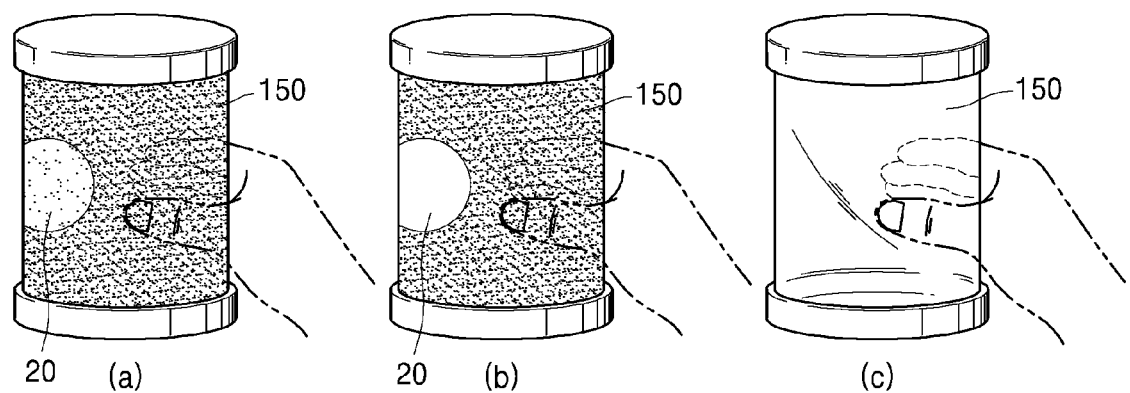
FIGS. 12A through 12B illustrate an example of adjusting the transparency of a display according to the magnitude of a pressure exerted on the display by user's hand holding the display.

FIGS. 12A through 12C illustrate an example of adjusting the transparency of the display 150 according to the magnitude of pressure exerted on the display by a user holding the device in their hand.

Referring to FIG. 12A, in response to a magnitude of the pressure applied to the display 150 by the user's hand holding being less than or equal to a first threshold value, the device 100 may make semitransparent a portion 20 of the display 150 which is opposite from the hand-held portion.

Referring to FIG. 12B, in response to a magnitude of the pressure applied to the display 150 by the user's hand holding the display exceedes the first threshold value but being less than or equal to a second threshold value, the device 100 may make transparent a portion 20 of the display 150 opposite from the hand held portion.

Referring to FIG. 12C, in response to a magnitude of the pressure applied to the display 150 by the user's hand holding exceeds the second threshold value, the device 100 may make the entire display 150 transparent.

Figure 13:
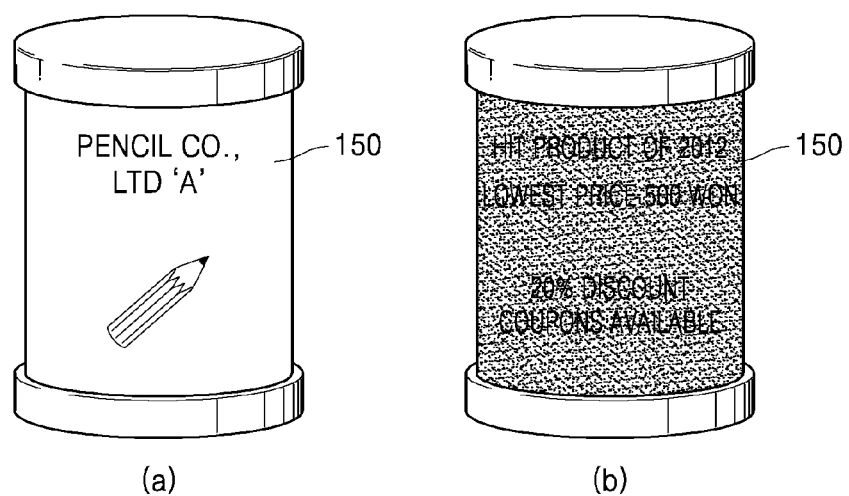
FIGS. 13A an 13B illustrate an example of displaying different product information on a display according to an exemplary embodiment depending on the transparency of the display.

FIGS. 13A and 13B illustrate an example of displaying different product information on a display 150 according to an exemplary embodiment, depending on the transparency of the display.

Referring to FIG. 13A, in response to the display 150 being transparent, the device 100 may display a product name and a brand name on the display 150.

Referring to FIG. 13B, in response to the display 150 being opaque, the device 100 may display advertising information, price information and coupon information on the display 150.

In response to one portion of the display 150 being transparent and another portion thereof being opaque, the device 100 may distinguish product information to be displayed on the transparent portion from that to be displayed on the opaque portion. However, the exemplary embodiments are not limited thereto.

In another exemplary embodiment, the display 150 may sequentially display various types of product information according to a user's touch input. For example, in response to the display 150 being touched once, the display 150 may display a product name. In response to the display 150 being touched twice, the display 150 may display a product price and a current inventory status. In response to the display 150 being touched three times, the display 150 may display a user's message related to a product. Alternatively, a product name, a product price and a current inventory status, and a user's message about a product may be respectively displayed on the display 150 in response to a first touch, a second touch, and a third touch on the display 150.

FIGS. 14A and 14B illustrate use of a display 150 as a part of a packaging material for a product 200 according to an exemplary embodiment.

Referring to FIG. 14A, the display 150 may be located on one face of the packaging material having a rectangular shape. In this case, the one face of the packaging material may have a quadrangular space into which the display 150 is fixedly inserted. The packaging material may include the device 100.

Referring to FIG. 14B, the display 150 may be disposed over two faces of a parallelepiped-shaped packaging material. In this case, the display 150 having a quadrangular shape may be bent at a right angle and fixedly inserted into the two faces of the packaging material. Only a bent portion of the display 150 may be formed of a flexible material.

Figure 15:
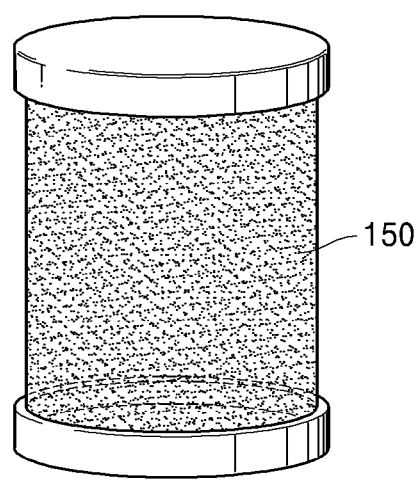
FIG. 15 illustrates an example of using of a display as part of a packaging material for a product according to another exemplary embodiment.

FIG. 15 illustrates an example of using of a display 150 as part of a packaging material for a product according to another exemplary embodiment.

Referring to FIG. 15, a quadrangular display 150 is rolled to form a shape like a side of a cylinder. The display 150 may be used to form a side surface of the packaging material. At least one of a base and a cover of the packaging material may include the device 100.

Figure 14:
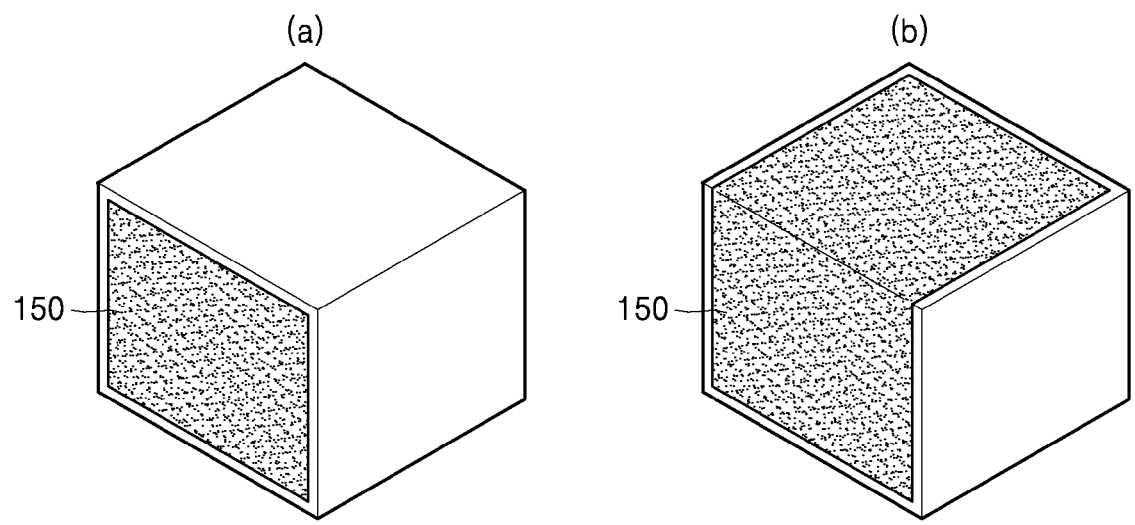
FIGS. 14A and 14B illustrate an example of using a display as part of a packaging material for a product according to an exemplary embodiment.

The packaging material and the display 150 may have shapes as shown in FIGS. 14 and 15, but are not limited thereto. That is, the packaging material and the display may have other various shapes. Furthermore, the display 150 may have a plurality of actuators at a bottom thereof and may be transformed into a predetermined shape according to voltages applied to the plurality of actuators.

Figure 16:
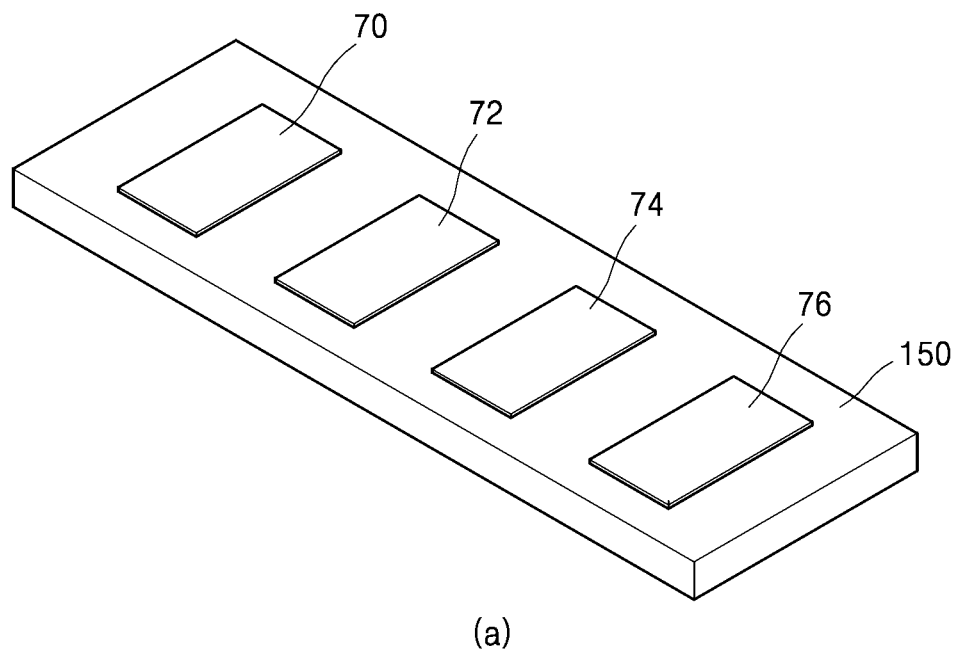
FIGS. 16A and 16B illustrate an exemplary embodiment of a bendable display.
Figure 16:
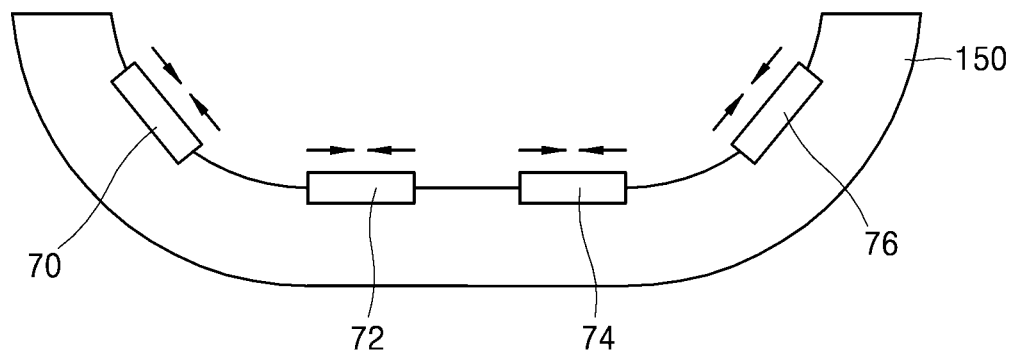

FIGS. 16A and 16B illustrate an exemplary embodiment of a flexible display 150.

Referring to FIG. 16A, the flexible display 150 according to an exemplary embodiment may have a plurality of actuators 70, 72, 74, and 76 disposed on a surface thereof. The actuators 70, 72, 74, and 76 may expand or contract depending on a magnitude of a voltage applied thereto.

Furthermore, as shown in FIG. 16B, upon application of a predetermined voltage to the plurality of actuators 70, 72, 74, and 76, the plurality of actuators 70, 72, 74, and 76 may contract. Accordingly, the flexible display 150 can be rolled.

Although the flexible display 150 has the four actuators 70, 72, 74, and 76, the exemplary embodiments are not limited thereto. The flexible display 150 may include a different number of actuators, and the device 100 may control deformation of the plurality of actuators to thereby finely transform the flexible display 150.

Figure 17:
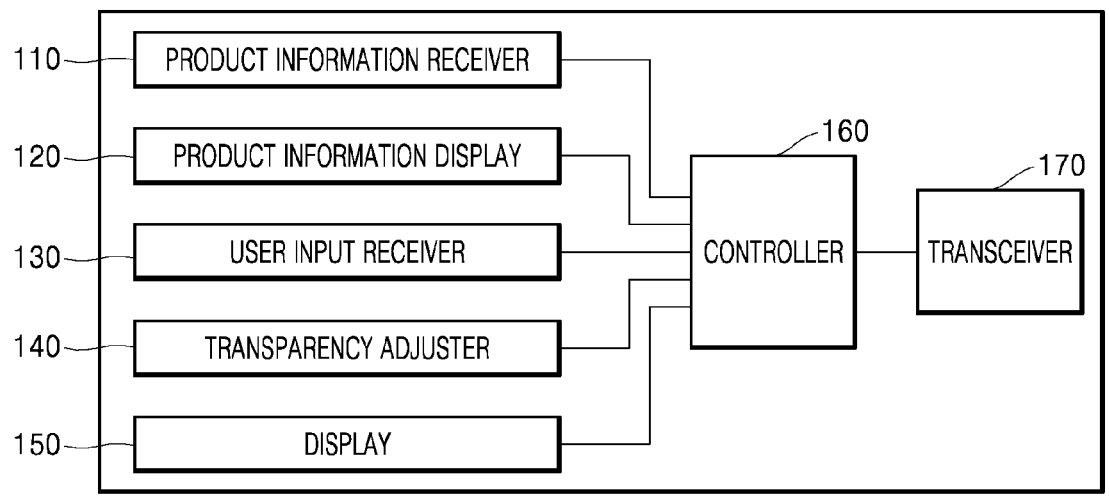
FIG. 17 is a block diagram of a device including a display according to an exemplary embodiment.

FIG. 17 is a block diagram of a device 100 including a display 150 according to an exemplary embodiment.

Referring to FIG. 17, the device 100 according to an exemplary embodiment includes a product information receiver 110, a product information display 120, a user input receiver 130, a transparency adjuster 140, a display 150, a controller 160 and a transceiver 170.

The product information receiver 110 receives product information from the product 200 in FIG. 1. The product 200 and the display 150 may each include NFC tags, so that the device 100 may receive the product information from the product 200 via NFC. The product information receiver 110 also receives an identifier value of the product 200 from the product 200 and receives various pieces of product information related to the product 200 from a separate server (not shown) based on the identifier value of the product 200. For example, the product information may include at least one of a product name, a brand name, a product description, a current inventory status, a warehousing plan, a price, discount coupons and advertising information. The product description may include an origin of the product 200, an expiry date, a nutritional content and an intended age range.

The product information display 120 outputs the product information to the display 150. The product information display 120 may display some pieces of the received production information on the display 150. The product information display 120 may also determine pieces of the product information to be displayed on the display 150 according to the transparency of the display 150. For example, in response to the display 150 being transparent, the product information display 120 may display a product name, a brand name, and a price on the display 150. On the other hand, in response to the display 150 being opaque, the product information display 120 may display on display 150 a product description, a current inventory status, a warehousing plan, and discount coupons. However, the exemplary embodiments are not limited thereto.

The product information display 120 changes the product information and outputs the resultant information to display 150. As the transparency of a portion of the display 150 or the entire display 150 is adjusted, the product information display 120 changes the product information displayed on the display 150 and outputs the resultant information to the display 150. In response to the entire display 150 being transparent, the product information display 120 may display a few pieces of the product information on the display 150. Conversely, in response to the entire display 150 being opaque, the product information display 120 may display many pieces of the product information on display 150. However, the exemplary embodiments are not limited thereto.

In response to a portion of the display 150 being transparent and another portion thereof being opaque, the product information display unit 120 may determine product information to be displayed on the display 150 based on an area of the transparent portion of the display 150. The product information display 120 may also separate product information to be displayed on the transparent portion of the display 150 from that to be displayed on the opaque portion thereof.

The user input receiver 130 receives a user input through the display 150. The user input may include a touch input on a portion of the display 150, an input that occurs when a user holds the display 150 in hand, and an input that occurs when the user lifts or lowers the display 150 while the user is holding the display in hand, but is not limited thereto. The user input receiver 130 may also receive the user input through the display 150 by using at least one of a touch sensor, a pressure sensor, an accelerometer and a gyro sensor.

The transparency adjuster 140 adjusts the transparency of the display 150. To do so, the transparency adjuster 140 determines a target portion of the display 150 whose transparency is to be adjusted based on a user input. The transparency adjuster 140 may determine the target portion based on a user's touch input. For example, in response to the user touching the display 150, the transparency adjuster 140 may adjust the transparency of a portion of the display 150 within a preset range touch point. In another example, in response to the user rubbing a portion of the display 150, the transparency adjuster 140 may adjust the transparency of the rubbed portion of the display 150. In yet another example, in response to the user drawing a closed curve on a surface of the display 150, the transparency adjuster 140 may adjust a region of the display 150 within the closed curve. However, the exemplary embodiments are not limited thereto, and the target portion may be determined according to other various criteria, e.g., based on a position of a portion of the display 150 touched by the user and the number of touches.

In another exemplary embodiment, the transparency adjuster 140 may determine the target portion based on an input by a user's hand holding. For example, in response to the user holding the display 150 in hand, the transparency adjuster 140 may adjust the transparency of a portion of the display 150 opposite from the hand-held portion. In this case, the transparency adjuster 140 may also determine an area of the target portion according to a magnitude of a pressure exerted on the display 150 by the user holding the device in their hand.

In another exemplary embodiment, the transparency adjuster 140 may determine the target portion based on a movement of the device 100. For example, in response to the user lifting the device 100, the transparency adjuster 140 may adjust the transparency of a lower portion of the display 150. Conversely, in response to the user putting the device 100 down, the device 100 may adjust the transparency of an upper portion of the display 150. In this case, the transparency adjuster 140 may detect the movement of the device 100 by using at least one of a motion sensor and a gyro sensor, but the exemplary embodiments are not limited thereto.

In another exemplary embodiment, the transparency adjuster 140 may determine a target portion based on an eye gaze direction of a user looking at the display 150. For example, in response to the user looking at a lower area of the display 150, the transparency adjuster 140 may adjust the transparency of a lower portion of the display 150. In response to the user looking at an upper portion of the display 150, the transparency adjuster 140 may adjust the transparency of an upper portion of the display 150. In this case, the transparency adjuster 140 may take a picture of the user with a camera to check the user's eye gaze direction based on the taken image, but the exemplary embodiments are not limited thereto.

Although a portion of the display 150 is determined as the target portion, the exemplary embodiments are not limited thereto. In other words, the transparency adjuster 140 may adjust the transparency of the entire display 150.

The transparency adjuster 140 also determines a degree of adjusting the transparency of the display 150 based on a user input. The transparency adjuster 140 may determine the degree of adjusting the transparency of the display 150 based on a user's touch input. In this case, the transparency adjuster 140 may adjust the transparency of the display 150 in a step-wise manner based on the number of touches. Alternatively, the transparency adjuster 140 may determine the degree of adjustment based on a pressure applied to the display 150 due to a user's touch thereon.

In another exemplary embodiment, the transparency adjuster 140 may determine the degree of adjusting the transparency of the display 150 based on an input by a user's hand holding the display. In this case, the transparency adjuster 140 may determine a degree of making the display 150 transparent based on a pressure exerted on the display 150 according to a magnitude of a pressure exerted on the display 150 by the user holding the device in their hand.

The transparency adjuster 140 also adjusts the transparency of the determined target portion of the display 150 according to the determined degree.

The display 150 displays product information. The transparency of a predetermined portion of the display 150 may be adjusted based on the determination by the transparency adjuster 140. The display 150 may be a flexible display that is foldable, bendable or rollable.

The controller 160 controls the product information receiver 110, the product information display 120, the user input receiver 130, the transparency adjuster 140, the display 150 and the transceiver 170 to be described later so that the device 100 may adjust the transparency of the display 150 based on a user's touch input and may display preset product information.

The transceiver 170 transceives various types of information with the product 200 and a server (not shown) so that the device 100 may adjust the transparency of the display 150 based on a user's touch input and may display preset product information.

Parts of or the entire product information receiver 110, product information display unit 120, user input receiver 130, and transparency adjuster 140 may be implemented by software modules installed in the device 100 or by separate hardware, and they may each perform an operation by using sensing information detected by a sensor built into the display 150, as described below.

Furthermore, the product information receiver 110, the product information display 120, the user input receiver 130, and the transparency adjuster 140 may be integrated into the controller 160. Alternatively, operations of the product information receiver 110, the product information display 120, the user input receiver 130, the transparency adjuster 140, and the controller 160 may be performed by using a single processor.

Figure 18:
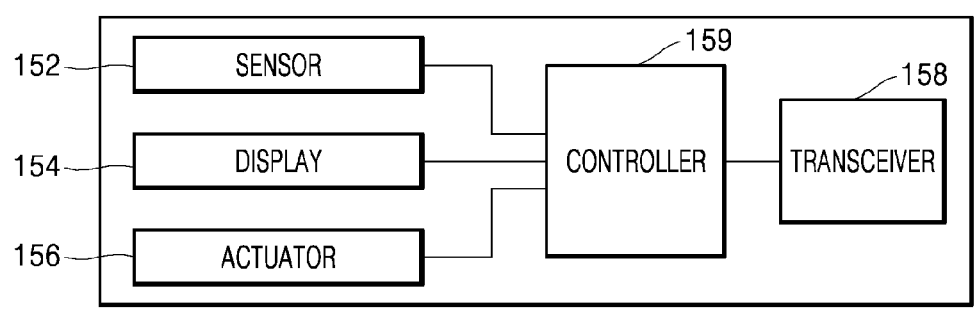
FIG. 18 is a block diagram of a display according to another exemplary embodiment.

FIG. 18 is a block diagram of a display 150 according to another exemplary embodiment. Referring to FIG. 18, the display 150 according to an exemplary embodiment includes a sensor 152, a display 154, at least one actuator 156, a transceiver 158, and a control 159. The display 150 may be included in the device 100, but is not limited thereto. The display 150 may be separated from the device 100, and in this case, the display 150 may transceive various types of information with the device 100 by using wired and wireless communications.

The sensor 152 detects a user input on the display 150. The sensor 152 may detect a user's touch input and an input by user's hand holding the device, as well as a movement of the display 150. Furthermore, the sensor 152 may include at least one of a touch sensor, a pressure sensor, a gyro sensor, a motion sensor, an optical sensor and a proximity sensor.

The display 154 displays product information. The display 154 may display some or all pieces of product information provided by the product 200. The transparency of a portion of or the entire display 154 may be adjusted. Upon adjusting its transparency, the display 154 may change the product information for display.

The at least one actuator 156 may contract or expand according to a voltage applied thereto and be disposed on a surface of the display 154.

The transceiver 158 provides sensing information generated by the sensor 152 to the controller 160 in the device 100 and receives product information provided by the controller 160. In response to the display 150 being separated from the device 100, the transceiver 158 may transceive various types of information with the transceiver 170 in the device 100 by using wired and wireless communications.

The controller 159 controls overall operations of the display 150. That is, the control unit 159 controls the sensor 152, the display 154, the at least one actuator 156, and the transceiver 158 so that the display 150 may detect a user input, display product information, and adjust the transparency of the display 154. In response to the display 150 being included in the device 100, the controller 159 may be integrated into controller 160.

Figure 19:
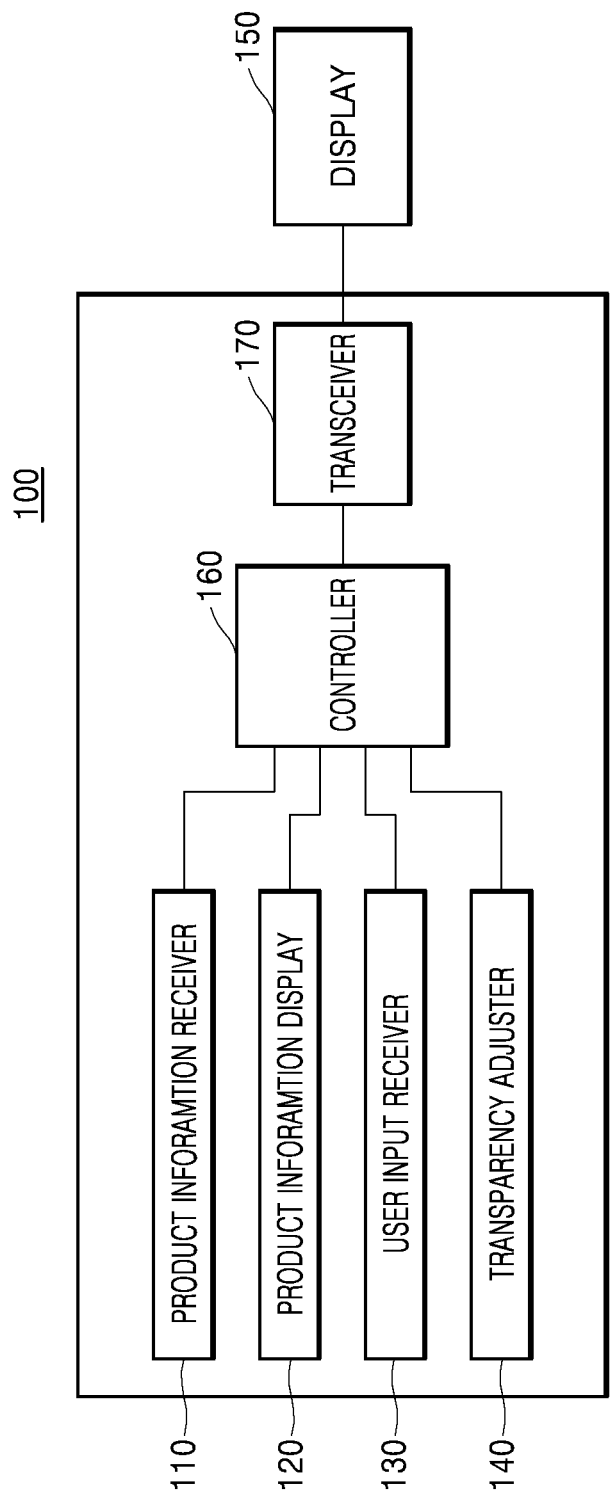
FIG. 19 illustrates an example in which a device and a display are separated from each other according to an exemplary embodiment.

FIG. 19 illustrates an example where a device 100 and a display 150 according to an exemplary embodiment are separated from each other.

As shown in FIG. 19, the device 100 and the display 150 are separate devices. In this case, the device 100 may transceive different types of information with the display 150 by using wired and wireless communications. The display 150 may transmit information related to a user input thereon to the device 100, and the device 100 may determine a target portion of the display 150 whose transparency will be adjusted as well as a degree of adjusting the transparency of the display 150 based on the user input. The device 100 may also provide the display 150 with product information and control information needed to adjust the transparency of the display 150.

Exemplary embodiments may be implemented through non-transitory computer-readable recording media having recorded thereon computer-executable instructions such as program modules that are executed by a computer. The non-transitory computer-readable media may be any available media that can be accessed by a computer and may include both volatile and nonvolatile media and both detachable and non-detachable media. Furthermore, the non-transitory computer-readable media may include computer storage media and communication media. The computer storage media include both volatile and nonvolatile and both detachable and non-detachable media implemented by any method or technique for storing information such as computer-readable instructions, data structures, program modules or other data. The communication media typically embody computer-readable instructions, data structures, program modules, other data of a modulated data signal such as a carrier wave, or other transmission mechanism and they may include any information transmission media.

The above description exemplary embodiments are provided for illustration, and it will be understood by those of ordinary skill in the art that various changes in form and details may be easily made therein without departing from the spirit and scope of the present invention as defined by the following claims. Thus, the exemplary embodiments described therein should be considered in a descriptive sense only and not for purposes of limitation. For example, each component defined as an integrated component may be implemented in a distributed fashion. Likewise, components defined as separate components may be implemented in an integrated manner.

The scope of the invention is defined not by the detailed description of the invention but by the appended claims, and all changes or modifications within the spirit and scope of the appended claims and their equivalents will be construed as being included in the present invention.

What is claimed is:

1. A method of adjusting transparency of a transparent display in a device including the transparent display, the method comprising:
   receiving product information from a tag attached to a product surrounded by the transparent display via short-range communication;

receiving a user input on an outer surface of the transparent display of the device;

adjusting transparency in a portion of the transparent display, based on the user input; and displaying, on the portion of the transparent display whose transparency has been adjusted, information related to the product based on the product information received from the tag, wherein the device comprises an inner surface of the device and an outer surface of the device, wherein the inner surface of the device is oriented toward the product surrounded by the transparent display, and the outer surface of the device is oriented away from the product surrounded by the transparent display, and wherein the outer surface of the device includes the outer surface of the transparent display.

2. The method of claim 1, wherein the input includes a touch input, wherein adjusting of the transparency in the portion of the transparent display includes adjusting a portion of the transparent display based on a determination regarding the touch input, and the transparency of the determined portion is adjusted.

3. The method of claim 2, wherein adjusting the transparency in the portion of the transparent display includes adjusting the transparency of a portion of the transparent display within a preset range from a touch input point.

4. The method of claim 2, wherein the touch input includes an input that occurs in response to a closed curve being drawn on a surface of the transparent display, wherein adjusting the transparency in the portion of the transparent display includes adjusting the transparency of a portion of the transparent display within the closed curve.

5. The method of claim 1, wherein the user input includes a touch input, wherein the adjusting of the transparency in the portion of the transparent display includes determining a degree of transparency in the portion of the transparent display based on the touch input, and the transparency in the portion of the transparent display is adjusted according to the determined degree of transparency.

6. The method of claim 5, wherein the adjusting the transparency in the portion of the transparent display includes adjusting the transparency in the portion of the transparent display in a step-wise manner based on a number of touches on the transparent display.

7. The method of claim 1, wherein the user input includes an input by a user's hand holding the display, wherein adjusting the transparency in the portion of the transparent display includes determining a portion of the transparent display whose transparency will be adjusted based on a position of the transparent display held by the user's hand, and the transparency of the determined portion is adjusted.

8. The method of claim 7, wherein the adjusting of the transparency in the portion of the transparent display includes adjusting the transparency of a portion of the transparent display opposite from the portion of the transparent display held by the user's hand.

9. The method of claim 1, wherein the user input includes an input by a user's hand holding the display, wherein the adjusting the transparency in the portion of the transparent display includes determining a degree of transparency in the portion of the transparent display based on a magnitude of a pressure exerted on the transparent display by the user's hand, and the transparency in the portion of the transparent display is adjusted according to the determined degree of transparency.

10. The method of claim 1, wherein the product information is received from the product by a Near Field Communication (NFC) reader included in the transparent display.

11. The method of claim 1, wherein the product information includes at least one of an identifier value of the product, a current inventory status, a warehouse plan, a price, discount coupons and advertising information.

12. The method of claim 1, wherein displaying the product information on the portion of the transparent display includes changing the displayed product information in response to the transparency of the transparent display being adjusted.

13. A non-transitory computer-readable recording medium having recorded thereon a program wherein the program, when executed on a processor of a computer, causes the computer to execute the method of claim 1.

14. The method of claim 1, wherein the portion of the transparent display whose transparency has been adjusted comprises a first portion, and the information related to the product comprises first information, and wherein the method further comprises displaying, on a second portion of the transparent display, second information related to the product based on the product information received from the tag, the second information being different from the first information.

15. The method of claim 14, wherein the first information comprises at least one from among a product name and a brand name, and the second information comprises at least one from among advertising information, price information and coupon information.

16. A device for adjusting transparency of a transparent display in a device including the transparent display, the device comprising:

a communication interface configured to receive product information from a tag attached to a product surrounded by the transparent display via short-range communication;

an input interface configured to receive a user input on an outer surface of the transparent display of the device;

a processor configured to adjust transparency in a portion of the transparent display, based on the received user input; and a display configured to display information related to the product, on the portion of the transparent display whose transparency has been adjusted, based on the product information received from the tag, wherein the device comprises an inner surface of the device and an outer surface of the device, wherein the inner surface of the device is oriented toward the product surrounded by the transparent display, and the outer surface of the device is oriented away from the product surrounded by the transparent display, and wherein the outer surface of the device includes the outer surface of the transparent display.

17. The device of claim 16, wherein the user input includes a touch input, wherein the processor is configured to determine a portion of the transparent display whose transparency will be adjusted based on the touch input, and adjusts the transparency of the determined portion.

18. The device of claim 17, wherein the processor adjusts the transparency of a portion of the transparent display within a preset range from a touch input point.

19. The device of claim 17, wherein the touch input includes an input that occurs in response to a closed curve being drawn on a surface of the transparent display,
wherein the processor is configured to adjust the transparency of a portion of the transparent display within the closed curve.

20. The device of claim 16, wherein the user input includes a touch input,
wherein the processor is configured to determine a degree of transparency in the portion of the transparent display based on the touch input, and adjusts the transparency in the portion of the transparent display according to the determined degree of transparency.

21. The device of claim 20, wherein the processor adjusts the transparency in the portion of the transparent display in a step-wise manner based on a number of touches on the transparent display.

22. The device of claim 16, wherein the user input includes an input performed by a user's hand holding the device,
wherein the processor is configured to determine a portion of the transparent display whose transparency will be adjusted based on a position of a portion of the transparent display held by the user's hand, and adjusts the transparency of the determined portion.

23. The device of claim 22, wherein the processor is configured to adjust the transparency of a portion of the transparent display opposite from the portion of the transparent display held by the user's hand.

24. The device of claim 16, wherein the user input includes an input by a user's hand holding the device,
wherein the processor is configured to determine a degree of transparency in the portion of the transparent display based on a magnitude of a pressure exerted on the transparent display by the user's hand holding the device, and adjusts the transparency in the portion of the transparent display according to the determined degree of transparency.

25. The device of claim 16, wherein the product information is received from the product by a Near Field Communication (NFC) reader included in the transparent display.

26. The device of claim 16, wherein the product information includes at least one of an identifier value of the product, a current inventory status, a warehouse plan, a price, discount coupons and advertising information.

27. The device of claim 16, wherein the display is configured to change the displayed product information and displays the resultant product information after the transparency in the portion of the transparent display has been adjusted.

28. A method of adjusting transparency of a transparent display in a transparent display apparatus including the transparent display, the method comprising:
receiving product information from a tag attached to a product surrounded by the transparent display via short-range communication;
sensing a user input on an outer surface of the transparent display;
adjusting, based on the sensed user input, transparency of a portion of the transparent display determined by a device connected to the transparent display apparatus, and
displaying, on the portion of the transparent display whose transparency has been adjusted, product information related to the product based on the product information received from the tag;
wherein adjusting the transparency includes adjusting the transparency of the determined portion according to control information received from the device,
wherein the transparent display apparatus comprises an inner surface of the transparent display apparatus and an outer surface of the transparent display apparatus,
wherein the inner surface of the transparent display apparatus is oriented toward the product surrounded by the transparent display, and the outer surface of the transparent display apparatus is oriented away from the product surrounded by the transparent display, and
wherein the outer surface of the transparent display apparatus includes the outer surface of the transparent display.

29. A non-transitory computer-readable recording medium having recorded thereon a program wherein the program, when executed on a processor of a computer, causes the computer to execute the method of claim 28.

30. A transparent display apparatus with a transparent display, the transparent display apparatus comprising:
a communication interface configured to receive product information from a tag attached to a product surrounded by the transparent display via short-range communication;
the transparent display, the transparent display being configured to display the product information;
a sensor configured to detect a user input on an outer surface of the transparent display of the transparent display apparatus; and
a processor configured to adjust, based on the detected user input, the transparency of a portion of the transparent display determined by a device connected to the transparent display apparatus, and
wherein the processor is configured to adjust the transparency of the determined portion according to control information received from the device,
wherein the transparent display apparatus comprises an inner surface of the transparent display apparatus and an outer surface of the transparent display apparatus,
wherein the inner surface of the transparent display apparatus is oriented toward the product surrounded by the transparent display, and the outer surface of the device is oriented away from the product surrounded by the transparent display, and
wherein the outer surface of the transparent display apparatus includes the outer surface of the transparent display.

31. A device for adjusting transparency of a transparent display forming part of the device, the device comprising:
a communication interface configured to receive product information from a tag attached to a product surrounded by the transparent display via short-range communication;
an input interface configured to receive a user input on an outer surface of the transparent display of the device;
a processor configured to adjust transparency in a portion of the transparent display; and
a display configured to display the product information related to the product, on the portion of the transparent display whose transparency has been adjusted, based on the product information received from the tag,
wherein the device comprises an inner surface of the device and an outer surface of the device,
wherein the inner surface of the device is oriented toward the product surrounded by the transparent display, and the outer surface of the device is oriented away from the product surrounded by the transparent display, and wherein the outer surface of the device includes the outer surface of the transparent display.

32. The device of claim 31, wherein the processor adjusts the transparency in the portion of the transparent display based on a user input.

33. The device of claim 31, wherein the user input includes a touch input, and
wherein the processor is configured to determine a portion of the transparent display whose transparency will be adjusted based on the touch input, and adjusts the transparency of the determined portion.

34. The device of claim 31, wherein the processor adjusts the transparency of a portion of the transparent display within a preset range from a touch input point.

35. The device of claim 31, wherein the user input includes an input that occurs in response to a closed curve being drawn on a surface of the transparent display,
wherein the processor is configured to adjust the transparency of a portion of the transparent display within the closed curve.

36. The device of claim 31, wherein the user input includes a touch input,
wherein the processor is configured to determine a degree of transparency in the portion of the transparent display based on the touch input, and adjust the transparency in the portion of the transparent display according to the determined degree of transparency.

37. The device of claim 36, wherein the processor adjusts the transparency in the portion of the transparent display in a step-wise manner based on a number of touches on the transparent display.

38. The device of claim 31, wherein the user input includes an input by a user's hand holding the device,
wherein the processor is configured to determine a degree of transparency in the portion of the transparent display based on a magnitude of a pressure exerted on the transparent display by the user's hand holding the device, and adjusts the transparency in the portion of the transparent display according to the determined degree of transparency.

39. The device of claim 31, further comprising a product information receiver configured to receive the product information from a tag attached to the product via short-range communication.

40. The device of claim 39, wherein the product information is received from the product by a Near Field Communication (NFC) reader included in the transparent display.

* * * * *